(12) United States Patent
Seo et al.

(10) Patent No.: US 9,323,446 B2
(45) Date of Patent: Apr. 26, 2016

(54) APPARATUS INCLUDING A TOUCH SCREEN AND SCREEN CHANGE METHOD THEREOF

(71) Applicant: SAMSUNG ELECTRONICS CO., LTD., Suwon-si (KR)

(72) Inventors: Joon-kyu Seo, Seongnam-si (KR); Kyung-A Kang, Seoul (KR); Ji-Yeon Kwak, Seoul (KR); Hyun-jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 13/922,637

(22) Filed: Jun. 20, 2013

(65) Prior Publication Data

US 2013/0342483 A1 Dec. 26, 2013

(30) Foreign Application Priority Data

Jun. 20, 2012 (KR) ........................ 10-2012-0066401

(51) Int. Cl.
*G06F 3/041* (2006.01)
*G06F 3/0488* (2013.01)

(52) U.S. Cl.
CPC ............ *G06F 3/0488* (2013.01); *G06F 3/0416* (2013.01); *G06F 3/04886* (2013.01)

(58) Field of Classification Search
None
See application file for complete search history.

(56) References Cited

U.S. PATENT DOCUMENTS

| | | |
|---|---|---|
| 2010/0302179 A1 | 12/2010 | Ahn et al. |
| 2011/0109567 A1 | 5/2011 | Kim |
| 2011/0124376 A1 | 5/2011 | Kim et al. |
| 2011/0209058 A1 | 8/2011 | Hinckley et al. |
| 2012/0084721 A1 | 4/2012 | Gimpl et al. |

FOREIGN PATENT DOCUMENTS

| | | |
|---|---|---|
| EP | 2407869 A1 | 1/2012 |
| KR | 1020090106312 A | 10/2009 |
| KR | 1020100099587 A | 9/2010 |

OTHER PUBLICATIONS

Written Opinion dated Sep. 26, 2013, issued by the International Searching Authority in counterpart International Application No. PCT/KR2013/005453.
International Searching Report dated Sep. 26, 2013, issued by the International Searching Authority in counterpart International Application No. PCT/KR2013/005453.
Communication dated Nov. 16, 2015 issued by European Patent Office in counterpart European Patent Application No. 13806548.7.

*Primary Examiner* — Nicholas Lee
(74) *Attorney, Agent, or Firm* — Sughrue Mion, PLLC

(57) ABSTRACT

An apparatus for screen change includes a touch screen to divisionally display a first region where a first screen is displayed and a second region where a second screen is displayed, and a controller to detect whether a display change event for a screen display change occurs in at least one of the first region and the second region, and to analyze the display change event and to change a display direction of the second screen while maintaining a display of the first screen.

23 Claims, 13 Drawing Sheets

APPARATUS INCLUDING A TOUCH SCREEN AND SCREEN CHANGE METHOD THEREOF

CROSS REFERENCE TO RELATED APPLICATION

This application claims priority from Korean Application Serial No. 10-2012-0066401, which was filed in the Korean Intellectual Property Office on Jun. 20, 2012, the entire contents of which is hereby incorporated by reference in its entirety.

BACKGROUND

1. Field

Apparatuses and methods consistent with exemplary embodiments relate generally to an apparatus including a touch screen and a controlling method thereof, and more particularly, to an apparatus including a touch screen that executes display of an image in a screen divided into two independent regions of the touch screen, and a controlling method thereof.

2. Description of the Related Art

Currently, as demand for smart phones and tablet has rapidly increased, research on a user interface method associated with a touch screen contained in the smart phone and the tablet has been actively conducted. In particular, research has been conducted so as to provide an interface method that is close to intuition associated with a user experience, and various interface methods that correspond with the user intuition have been provided.

Particularly, most smart phones or tablets include a touch screen and thus, the objective of the recent research on the interface method is set to development of a method that enables a user to readily and accurately manipulate a touch screen.

When a single application is executed, a conventional smart phone or tablet employs an architecture that displays, on the entire touch screen, a window for displaying the single application. Accordingly, when a user of a smart phone or tablet desires to execute another application while displaying an application, the smart phone or tablet may stop displaying the displayed application and may display the other application. When the user desires to execute another application, the user may need to perform manipulation for switching a screen into an initial menu screen, and may need to perform, on the menu screen, manipulation for executing the other application.

When the user performs multi-tasking of a plurality of applications, there may be inconvenience in that the user continuously performs manipulation for switching a screen among applications, and there may be a drawback in that the user may not readily recognize the progress of the applications.

Also, when a plurality of users use a single smart phone or tablet, there may be inconvenience in that a workspace of each user may overlap each other.

Therefore, there is a desire for development of an architecture that divides a single touch screen and to display each application when a plurality of applications are executed, and a method that effectively displays the applications in the divided screens.

SUMMARY

Accordingly, an aspect of the exemplary embodiments is to solve at least the above-described problems occurring in the prior art, and to provide at least the advantages described below.

Another aspect of the exemplary embodiments is to provide an architecture that divides a touch screen and displays each application, and a method that controls an application display screen to comply with user convenience in each divided screen.

In accordance with another aspect of an exemplary embodiments, an apparatus includes a touch screen to divisionally display a first region where a first screen is displayed and a second region where a second screen is displayed; and a controller to detect whether a display change event for a screen display change occurs in at least one from among the first region and the second region, and to analyze the display change event and to change a display direction of the second screen while maintaining a display of the first screen.

The display change event may correspond to an event of inputting a screen hold gesture to the first region and inputting a screen change gesture to the second region. The screen hold gesture and the screen change gesture may be input simultaneously.

The screen hold gesture may correspond to a gesture of touching a point of the first region and then holding a touch on the point.

The screen change gesture may correspond to a gesture of touching a point of the second region and then flicking the point one from among rightward, downward, leftward, and upward.

The screen change gesture may correspond to a gesture of touching the point of the second region and then flicking the point one from among rightward, upward, and leftward, the controller rotates the second screen by one from among 90 degrees, 180 degrees, and 270 degrees, respectively, in a counterclockwise direction.

The screen change gesture may correspond to one from among a drag gesture from a top of the second region to a right end of the second region, a drag gesture from the right end of the second region to a bottom of the second region, a drag gesture from the bottom of the second region to a left end of the second region, a drag gesture from the left end of the second region to the top of the second region, a drag gesture from the top of the second region to the left end of the second region, a drag gesture from the left end of the second region to the bottom of the second region, a drag gesture from the bottom of the second region to the right end of the second region, and a drag gesture from the right end of the second region to the top of the second region.

The screen change gesture may correspond to one from among a motion to rotate and a motion to tilt the apparatus one from among clockwise and counterclockwise.

The controller performs controlling to display the second screen with a changed aspect ratio.

Each of the first screen and the second screen comprises a window which corresponds to a screen for executing an application.

Each of the first screen and the second screen comprises a screen corresponding to a view.

In accordance with an aspect of an exemplary embodiment, there is provided an apparatus comprising: a first housing comprising a first touch screen to display a first region where a first screen is displayed; a second housing comprising a second touch screen to display a second region where a second screen is displayed, the first housing and the second housing being connected by at least one from among a hinge and flexible member; and a controller to detect whether a display change event for a screen display change occurs in at least one from among the first region and the second region, and to analyze the display change event and change a display direction of the second screen while maintaining a display of the first screen.

In accordance with another aspect of an exemplary embodiment, a method for screen change of an apparatus comprising a touch screen including a first region where a first screen is displayed and a second region where a second screen is displayed is provided. The method comprises: divisionally displaying the first screen in the first region and the second screen in the second region; detecting whether a display change event for a screen display change occurs in at least one from among the first region and the second region; and analyzing the display change event and changing a display direction of the second screen while maintaining a display of the first screen.

The detecting whether the display change event occurs may comprise: determining whether a screen hold gesture has been input to the first region; and determining whether a screen change gesture has been input to the second region.

The screen hold gesture may correspond to a gesture of touching a point of the first region and then holding the touch on the point.

The screen change gesture corresponds to a gesture of touching a point of the second region and then flicking the point one from among rightward, downward, leftward, and upward.

The changing the display direction of the second screen while maintaining the display of the first screen may comprise: when the screen change gesture corresponds to a gesture of touching the point of the second region and then flicking the point one from among rightward, upward, and leftward, performing controlling to rotate the second screen by one from among 90 degrees, 180 degrees, and 270 degrees, respectively, in a counterclockwise direction.

The screen change gesture may correspond to one from among a drag gesture from a top of the second region to a right end of the second region, a drag gesture from the right end of the second region to a bottom of the second region, a drag gesture from the bottom of the second region to a left end of the second region, a drag gesture from the left end of the second region to the top of the second region, a drag gesture from the top of the second region to the left end of the second region, a drag gesture from the left end of the second region to the bottom of the second region, a drag gesture from the bottom of the second region to the right end of the second region, or a drag gesture from the right end of the second region to the top of the second region.

The screen change gesture may correspond to one from among a motion to rotate and a motion to tilt the apparatus one from among clockwise and counterclockwise.

The changing the display direction of the second screen while maintaining the display of the first screen may comprise: displaying the second screen with a changed aspect ratio.

Each of the first screen and the second screen may comprise a window which corresponds to a screen for executing an application.

Each of the first screen and the second screen may comprise a screen corresponding to a view.

According to various exemplary embodiments, there may be provided an architecture that divides a touch screen and displays each application, and a method that controls an application display screen to comply with user intuition in each divided screen.

Accordingly, the user may readily recognize the progress of the applications when manipulating a touch screen in which applications are displayed on divided screens. Also, when a plurality of users work by sharing a single smart phone or tablet, workspaces may not overlap each other and thus, an effective work environment may be provided.

BRIEF DESCRIPTION OF THE DRAWINGS

The above and other aspects, features, and advantages of the exemplary embodiments will be more apparent from the following detailed description taken in conjunction with the accompanying drawings, in which.

DETAILED DESCRIPTION OF EXEMPLARY EMBODIMENTS

Figure 1A:
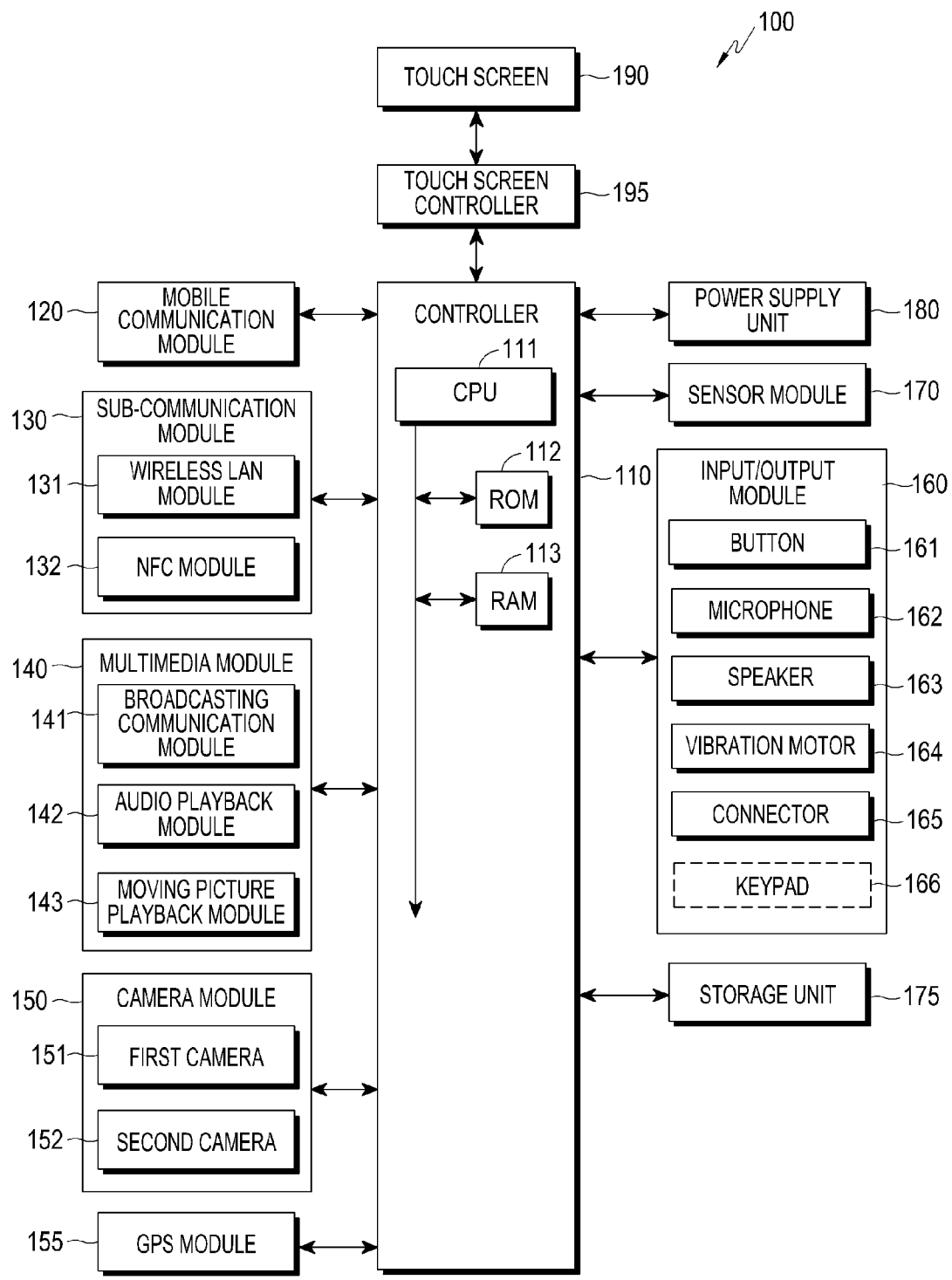
FIGS. 1A to 1D are block diagrams and views showing the concept of an apparatus according to various exemplary embodiments.

Hereinafter, various exemplary embodiments will be described with reference to the accompanying drawings. In the following description, the same elements will be designated by the same reference numerals although they are shown in different drawings. Further, in the following description of the exemplary embodiments, a detailed description of known functions and configurations incorporated herein will be omitted. Inclusion of such detailed description of known functions and configurations may make the subject matter of the present invention rather unclear.

FIG. 1A is a block diagram illustrating an apparatus including a touch screen according to an exemplary embodiment.

As illustrated in FIG. 1A, an apparatus 100 including a touch screen may be connected to an external apparatus (not illustrated) using a mobile communication module 120, a sub-communication module 130, and a connector 165. The "external apparatus" includes another apparatus (not illustrated), a portable phone (not illustrated), a smart phone (not illustrated), a tablet PC (not illustrated), and a server (not illustrated).

Referring to FIG. 1A, the apparatus 100 includes a touch screen 190 and a touch screen controller 195. The apparatus 100 includes a controller 110, the mobile communication module 120, the sub-communication module 130, a multimedia module 140, a camera module 150, a GPS module 155, an input/output module 160, a sensor module 170, a storage unit 175, and a power supply unit 180. The sub-communication module 130 includes at least one of a wireless LAN module 131 and a near field communication (NFC) module 132, and the multimedia module 140 includes at least one of a broadcasting communication module 141, an audio playback module 142, and a moving picture playback module 143. The camera module 150 includes at least one of a first camera 151 and a second camera 152. The input/output module 160 includes at least one of a button 161, a microphone 162, a speaker 163, a vibration motor 164, a connector 165, and a keypad 166.

The controller 110 may include a CPU 111, a ROM 112 storing a control program for controlling the apparatus 100, and a RAM 113 that memorizes a signal or data input from the outside of the apparatus 100 or that is used as a memory region for an operation performed in the apparatus 100. The CPU 111 may include a single core, a dual-core, a triple-core, or a quad-core. The CPU 111, the ROM 112, and the RAM 113 may be mutually connected through an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, a touch screen 190, and the touch screen controller 195.

The mobile communication module 120 connects the apparatus 100 to an external apparatus through mobile communication, using at least one antenna or a plurality of antennas (not illustrated) based on the controlling of the controller 110. The mobile communication module 120 performs transmitting and receiving a wireless signal for a voice call, a video call, a short message service (SMS), or a multimedia message service (MMS), with a portable phone (not illustrated) having a phone number input to the apparatus 100, a smart phone (not illustrated), a tablet PC (not illustrated), or another apparatus (not illustrated).

The sub-communication module 130 may include at least one of the wireless LAN module 131 and the NFC module 132. For example, the sub-communication module 130 may include only the wireless LAN module 131, may include only the NFC module 132, or may include both the wireless LAN module 131 and the NFC module 132.

The wireless LAN module 131 may be connected to the Internet at a place where a wireless access point (AP) (not illustrated) is installed, based on the controlling of the controller 110. The wireless LAN module 131 supports the wireless LAN standards (IEEE802.11x) of the Institute of Electrical and Electronic Engineers (IEEE). The NFC module 132 may wirelessly perform NFC between the apparatus 100 and an image forming apparatus (not illustrated) based on the controlling of the controller 110. The NFC scheme may include Bluetooth, Infrared Data Association (IrDA), and the like.

The apparatus 100 may include at least one of the mobile communication module 120, the wireless LAN module 131, and the NFC module 132, depending on performance. For example, depending on the performance, the apparatus 100 may include a combination of the mobile communication module 120, the wireless LAN module 131, and the NFC module 132.

The multimedia module 140 may include the broadcasting communication module 141, the audio playback module 142, or the moving picture playback module 143. The broadcasting communication module 141 may receive a broadcasting signal (for example, a TV broadcasting signal, a radio broadcasting signal, or a data broadcasting signal) and broadcasting subsidiary information (for example, (Electric Program Guide (EPG)) or (Electric Service Guide (ESG))) transmitted from a broadcasting station, through a broadcasting communication antenna (not illustrated), based on the controlling of the controller 110. The audio playback module 142 may play back a stored or received digital audio file (of which a file extension may be mp3, wma, ogg, or wav) based on the controlling of the controller 110. The moving picture playback module 143 may play back a stored or received digital moving picture file (of which a file extension may be mpeg, mpg, mp4, avi, mov, or mkv) based on the controlling of the controller 110. The moving picture playback module 143 may play back a digital audio file.

The multimedia module 140 may include the audio playback module 142 and the moving picture playback module 143, excluding the broadcasting communication module 141. Also, the audio playback module 142 or the moving picture playback module 143 of the multimedia module 140 may be included in the controller 100.

The camera module 150 may include at least one of a first camera 151 and a second camera 152 that captures a still image or a moving picture based on the controlling of the controller 110. The camera module 150 may include one of the first camera 151 and the second camera 152, or may include both the first camera 151 and the second camera 152. Also, the first camera 151 or the second camera 152 may include a secondary light source (for example, a flash (not illustrated)) that provides an amount of light required for capturing an image. For one example, the first camera 151 and the second camera 152 are disposed close to each other (for example, a distance between the first camera 151 and the second camera 152 is greater than 1 cm and less than 8 cm) and thus, a three-dimensional (3D) still image or a 3D moving picture may be captured. When the distance between the first camera 151 and the second camera 152 is less than a width (for example, orthogonal to the distance) of a first housing 100a, the first camera 151 and the second camera 152 may be disposed on a front side and a back side of the apparatus 100, respectively.

The GPS module 155 may receive an electric wave from a plurality of GPS satellites (not illustrated) in the earth's orbit, and may calculate a location of the apparatus 100 based on a Time of Arrival (TOA) from a GPS satellite (not illustrated) to the apparatus 100.

The input/output module 160 may include at least one of the plurality of buttons 161, the microphone 162, the speaker 163, the vibration motor 164, the connector 165, and the keypad 166.

The microphone 162 receives an input of a voice or a sound and generates an electric signal, based on the controlling of the controller 110. A single microphone 162 or a plurality of microphones 162 may be disposed.

The speaker 163 may output, to the outside of the apparatus 100, a sound corresponding to various signals (for example, a wireless signal, a broadcasting signal, a digital audio file, a digital moving picture file, an image capturing signal, and the like) of the mobile communication module 120, the sub-communication module 130, the multimedia module 140, or the camera module 150. The speaker 163 may output a sound (for example, a button manipulation sound corresponding to a phone call or a ring-back tone) corresponding to a function performed by the apparatus 100.

The vibration motor 164 may convert an electric signal into a mechanical vibration based on the controlling of the controller 110. For example, when the apparatus 100 in a vibration mode receives a voice call from another device (not illustrated), the vibration motor 164 may operate.

According to an exemplary embodiment, the vibration motor 164 of the apparatus 100 may operate in response to a touch on the touch screen 190.

The connector 165 may be used as an interface for connecting the apparatus 100 and an external apparatus (not illustrated) or a power source (not illustrated). Based on the controlling of the controller 110, data stored in the storage unit 175 of the apparatus 100 may be transmitted to an external apparatus (not illustrated) or data may be received from an external apparatus (not illustrated) through a wired cable connected to the connector 165. Through the wired cable connected to the connector 165, power may be input from a power source (not illustrated) or a battery (not illustrated) may be charged.

The keypad 166 may receive a key input from the user for controlling the apparatus 100. The keypad 166 includes a physical keypad (not illustrated) formed on the apparatus 100 or a virtual keypad (not illustrated) displayed on the touch screen 190. The physical keypad (not illustrated) formed on the apparatus 100 may be excluded depending on the performance or a configuration of the apparatus 100.

The sensor module 170 includes at least one sensor to detect a state of the apparatus 100. For example, the sensor module 170 may include a proximity sensor to detect proximity of the user to the apparatus 100, an illuminance sensor to detect an amount of light around the apparatus 100, or a motion sensor (not illustrated) to detect a motion of the apparatus 100 (for example, the rotation of the apparatus 100 and the acceleration or the vibration applied to the apparatus 100). The at least one sensor may detect the state, and may generate a signal corresponding to the detection so as to transmit the generated signal. A sensor of the sensor module 170 may be added or removed depending on the performance of the apparatus 100.

The storage unit 175 may store a signal or data input/output in association with an operation of the mobile communication module 120, the sub-communication module 130, the multimedia module 140, the camera module 150, the GPS module 155, the input/output module 160, the sensor module 170, the touch screen 190, based on the controlling of the controller 110. The storage unit 175 may store a control program for controlling the apparatus 100 or the controller 110.

The term "storage unit" includes the storage unit 175, the ROM 112 and RAM 113 included in the controller 110, or a memory card (not illustrated) (for example, an SD card and a memory stick) contained in the apparatus 100. The storage unit may include a non-volatile memory, a volatile memory, a Hard Disk Drive (HDD), or a Solid State Drive (SSD).

The power supply unit 180 may supply power to one battery or a plurality of batteries (not illustrated), based on the controlling of the controller 110. One or a plurality of batteries (not illustrated) may provide power to the apparatus 100. Also, the power supply unit 180 may supply, to the apparatus 100, power input from an external power source (not illustrated) through the wired cable connected to the connector 165.

The touch screen 190 may provide a user with user interfaces corresponding to various services (for example, communication, data transmission, broadcasting, and image capturing). The touch screen 190 may transmit, to the touch screen controller 195, an analog signal corresponding to at least one touch input to a user interface. The touch screen 190 may receive an input of at least one touch through a body part of the user (for example, a finger including a thumb) or a touch device (for example, a stylus pen). Also, the touch screen 190 may receive an input of successive motions of one touch from among the at least one touch. The touch screen 190 may transmit, to the touch screen controller 195, an analog signal corresponding to the successive motions of the input touch.

In exemplary embodiments, the touch may not be limited to a contact between the touch screen 190 and a body part of the user or a touch device, and may include a non-contact (for example, the case in which a detectable distance between the touch screen 190 and the body part of the user or the touch device is less than or equal to 1 mm). The detectable distance that may be detected by the touch screen 190 may be changed based on the performance or a configuration of the apparatus 100.

The touch screen 190 may be embodied, for example, based on a resistive scheme, a capacitive scheme, an infrared scheme, or an acoustic wave scheme.

The touch screen controller 195 converts an analog signal received from the touch screen 190 into a digital signal (for example, X and Y coordinates), and transmits the converted digital signal to the controller 110. The controller 110 may control the touch screen 190 using the digital signal received from the controller 195. For example, the controller 110 may perform controlling so as to select a shortcut icon (not illustrated) displayed on the touch screen 190 or to execute the short icon (not illustrated), in response to a touch. Also, the touch screen controller 195 may be included in the controller 110.

Figure 1B:
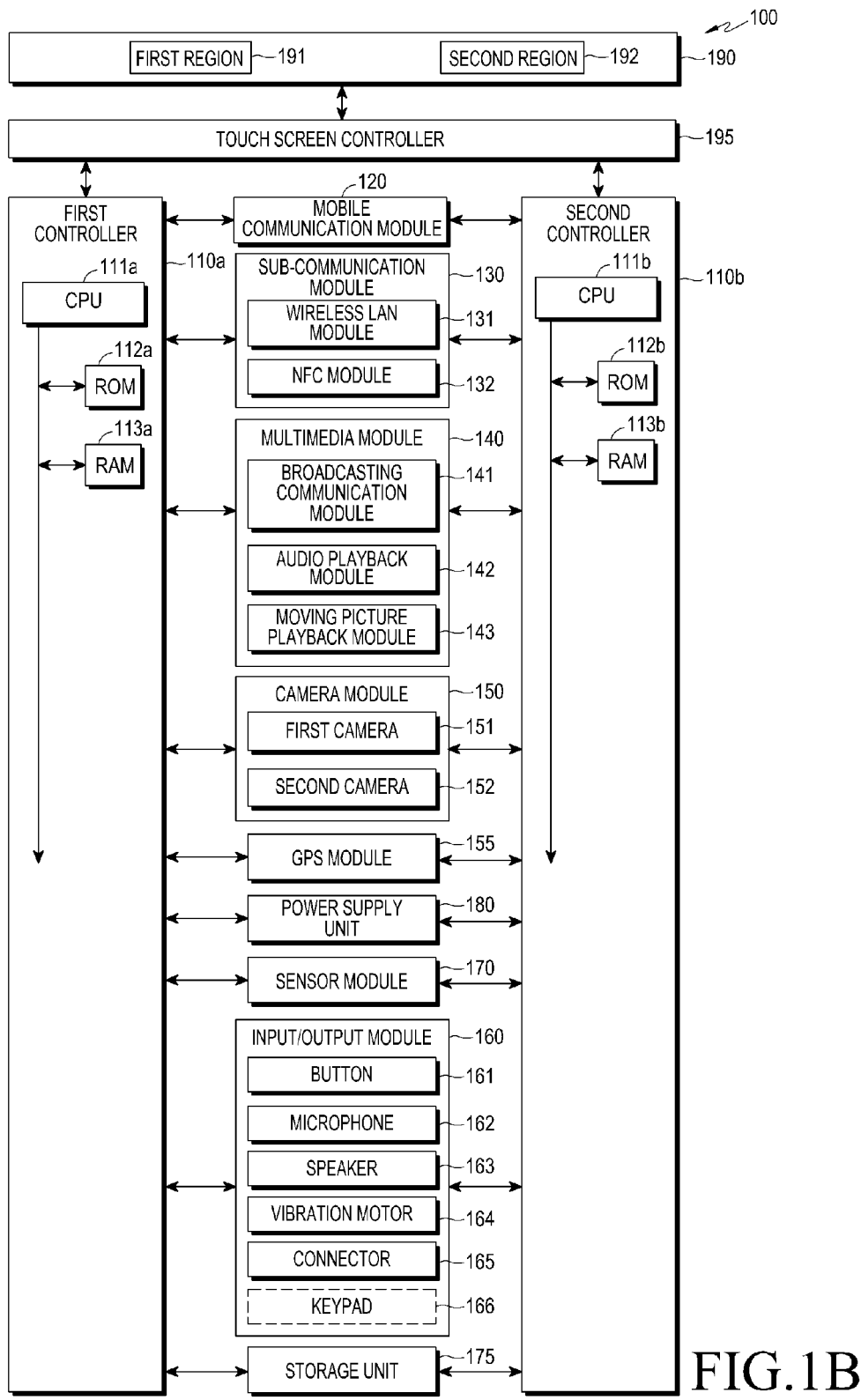

FIG. 1B is a block diagram illustrating an apparatus according to another exemplary embodiment.

Referring to FIG. 1B, the apparatus 100 includes substantially the same component elements as the component elements of FIG. 1A, including a first controller 110a, a second controller 110b, and the touch screen 190 and thus, redundant descriptions will be omitted.

The first controller 110a may include a CPU 111a, a ROM 112a storing a control program for controlling the apparatus 100, and a RAM 113a that memorizes a signal or data input from the outside of the apparatus 100, or is used for a memory region for an operation performed in the apparatus 100.

The first controller 110a may control the mobile communication module 120, the sub-communication module 130, the multimedia module 140, the camera module 150, the GPS module 155, the input/output module 160, the sensor module 170, the storage unit 175, the power supply unit 180, a first window, or first region, 191 of the touch screen 190, and the touch screen controller 195. Here, the first window 191 and a second window, or second region, 192 indicate independent regions that are divided from the touch screen 190. Although the first window 191 and the second window 192 may be embodied by dividing the entire touch screen 190, this may be merely an example. The first window 191 and the second window 192 may be independent regions included in the entire touch screen 190. The first region 191 and the second region 192 may be considered as independent divided regions of the touch screen 190 in terms of the vision of the user. In terms of hardware, the first region 191 and the second region 192 may be independent division sets of pixels included in the touch screen 190. A conceptual positional relationship between the first region 191 and the second region 192 will be described in more detail.

The touch screen controller 195 converts an analog signal received from a touch screen corresponding to the first region 191 into a digital signal (for example, X and Y coordinates), and transmits the converted signal to the first controller 110a. The controller 110a may control the first region 191 of the touch screen 190 by using the digital signal received from the touch screen controller 195. Also, the touch screen controller 195 may be included in the controller 110a.

The second controller 110b may include a CPU 111b, a ROM 112b storing a control program for controlling the apparatus 100, and a RAM 113b that memorizes a signal or data input from the outside of the apparatus 100 or is used as a memory region for an operation performed in the apparatus 100.

The second controller 110b may control the mobile communication module 120, the sub-communication module 130, the multimedia module 140, the camera module 150, the GPS module 155, the input/output module 160, the sensor module 170, the storage unit 175, the power supply unit 180, the touch screen 190, particularly, the second region 192 of the touch screen 190, and the touch screen controller 195.

The touch screen controller 195 converts an analog signal received from the touch screen 190 corresponding to the second region 192 into a digital signal (for example, X and Y coordinates) and transmits the converted signal to the second controller 110b. The second controller 110b may control the touch screen 190, particularly, the touch screen corresponding to the second region 192, using the digital signal received from the touch screen controller 195. Also, the touch screen controller 195 may be included in the second controller 110b.

In an exemplary embodiment, the first controller 110a may control at least one component element (for example, the touch screen 190, the touch screen controller 195, the mobile communication module 120, the sub-communication module 130, the multimedia module 140, the first camera 151, the GPS module 155, a first button group 161a, a power/lock button (not illustrated), at least one volume button (not illustrated), the sensor module 170, the storage unit 175, the power supply unit 180).

The second controller 110b may control at least one component element (for example, the touch screen 190, the touch screen controller 195, the second camera 152, a second button group 161b, the storage unit 175, and the power supply unit 180).

In another exemplary embodiment, the first controller 110a and the second controller 110b may control the component elements of the apparatus 100 based on a module unit (for example, the first controller 110a controls the mobile communication module 120, the sub-communication module 130, and the input/output module 160, and the second controller 110b controls the multimedia module 140, the camera module 150, the GPS module 155, and the sensor module 170). The first controller 110a and the second controller 110b may control the component elements of the apparatus 100 based on a priority (for example, the first controller 110a gives priority to the mobile communication module 120 and the second controller 110b gives priority to the multimedia module 140). The first controller 110a and the second controller 110b may be separated from each other. Also, the first controller 110a and the second controller 110b may be embodied in a single controller including a CPU having a plurality of cores such as a dual-core.

Figure 1C:
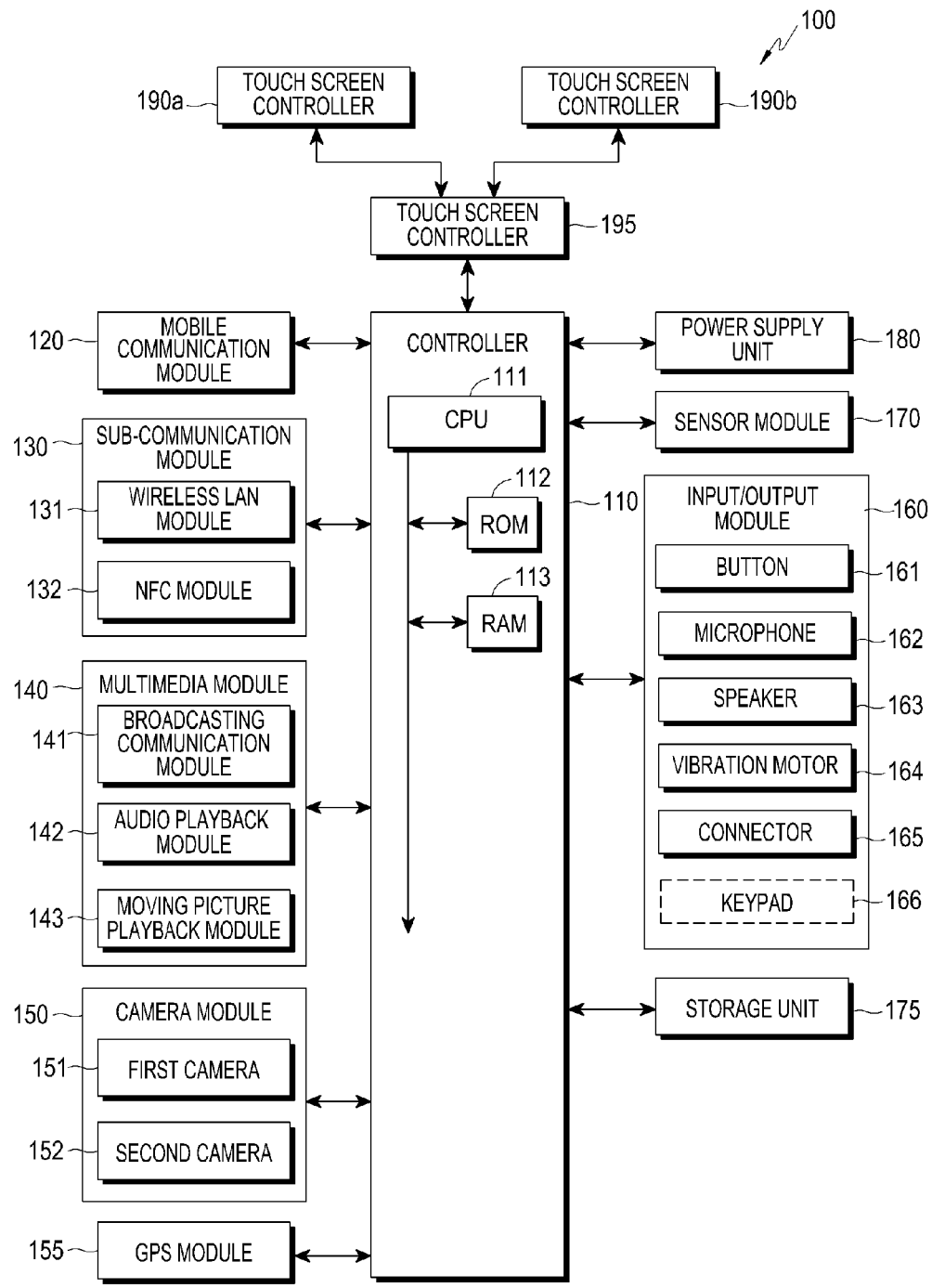

FIG. 1C is a block diagram of an apparatus according to another embodiment of the present invention. As shown in FIG. 1C, the apparatus 100 includes a first touch screen 190a, a second touch screen 190b, and a touch screen controller 195. That is, the apparatus 100 may include the first touch screen 190a and the second touch screen 190b as independent hardware units.

Figure 1D:
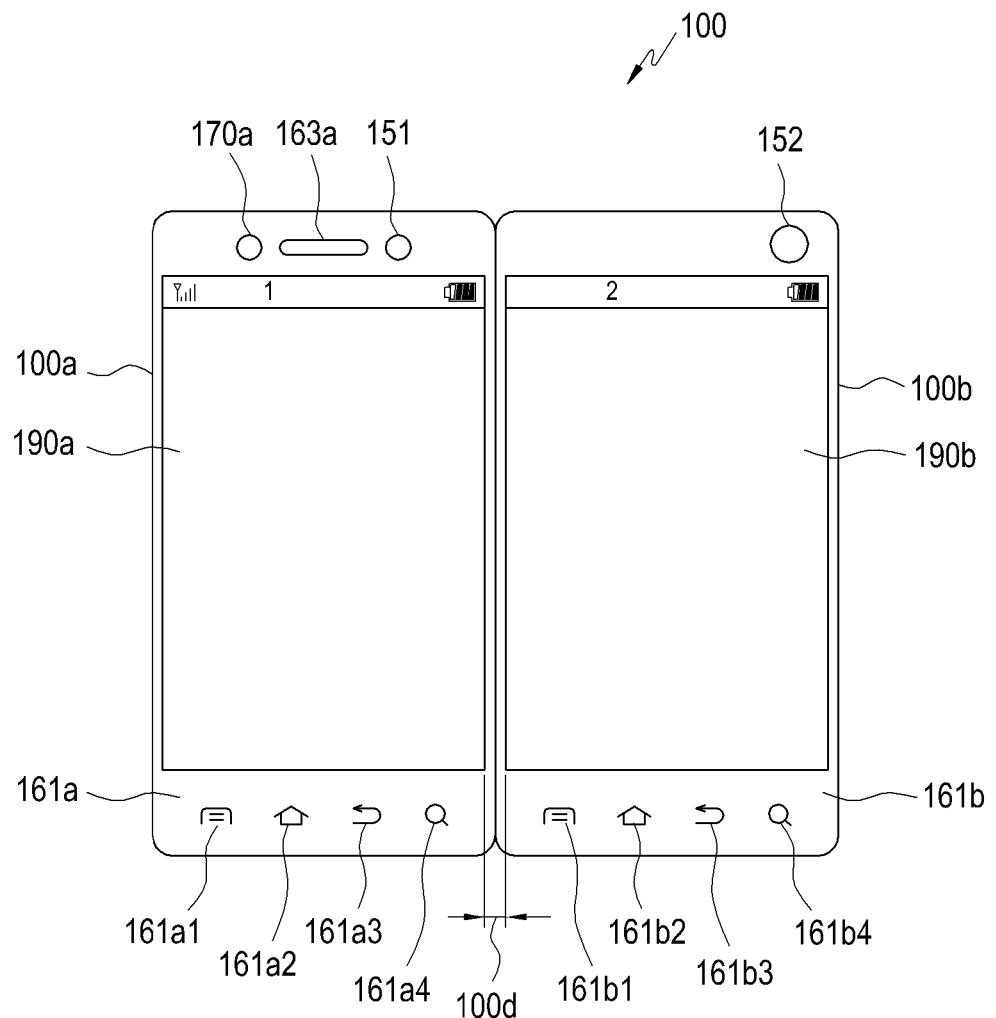

FIG. 1D is a view for describing a concept of the exemplary embodiment shown in FIG. 1C. Referring to FIG. 1D, the apparatus 100 having a plurality of touch screens includes a first housing 100a and a second housing 100b, sides of which are connected to each other through a hinge or a flexible plastic member. Central parts of front surfaces of the first housing 100a and the second housing 100b in an open state are spaced from each other and are disposed in parallel to each other with an interval 100d between the first touch screen 190a and the second touch screen 190b.

A first camera 151 for taking a still image or a video, a proximity sensor 170a for detecting approach of a user or an object, and a first speaker 163a for outputting voice and/or sound to the outside of the apparatus 100 are disposed on an upper part of the front surface of the first housing 100a, the first touch screen 190a is disposed on a central part of the front surface thereof, and a first button group 161a including one button 161a2 or a plurality of buttons 161a1 to 161a4 is disposed on a lower upper part of the front surface of the first housing 100a.

A second camera 152 for taking a still image or a video is disposed on an upper part of the front surface of the second housing 100b, the second touch screen 190b is disposed on a central part of the front surface thereof, and a second button group 161b including one button 161b2 or a plurality of buttons 161b1 to 161b4 is disposed on a lower upper part of the front surface thereof.

In relation to the elements of the apparatus 100 illustrated in FIG. 1D, at least one element may be added or deleted based on the performance of the apparatus 100. Further, it would be easily understood by one skilled in the art that the locations of the elements can be changed according to the structure or the performance of the apparatus 100.

Figure 2A:
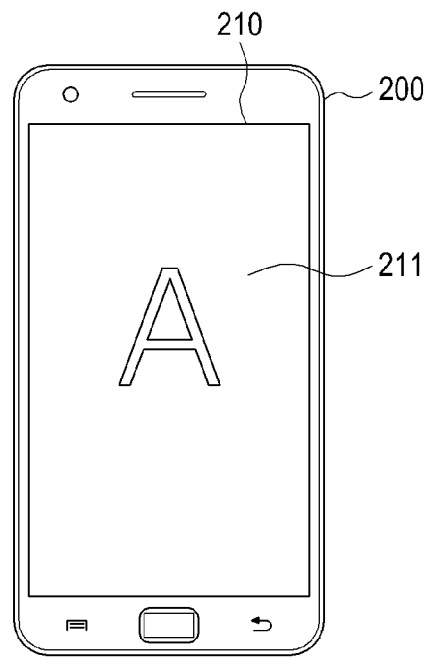
FIGS. 2A to 2E are conceptual diagrams of apparatuses according to various exemplary embodiments.

FIG. 2A is a view illustrating a concept of an apparatus according to an exemplary embodiment. The apparatus 200 shown in FIG. 2A is based on the exemplary embodiment shown in FIG. 1A or 1B. As shown in FIG. 2A, the apparatus 200 may include a touch screen 210. A first screen 211 may be displayed on the touch screen 210. The first screen 211 may render various icons, multimedia, an application execution screen, and the like. Also, the first screen 211 may be the first window. A window may be a screen that simultaneously displays an application execution screen and the identity in association with a single application, and may include at least one view. A view may be a single independent display unit, and may be an object that provides a visual image. For example, the view may be a view to display a designated characteristic, and may include a text view to display a previously designated character on a coding level, an image view to display an image on a resource, a file, and a website, and the like. Meanwhile, as described later in more detail, the first screen may be a first view.

Figure 2B:
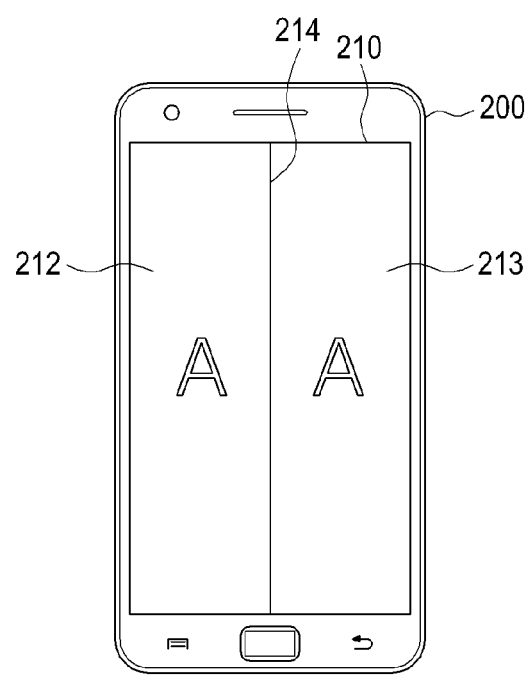

FIG. 2B is a view illustrating a concept of an apparatus according to an exemplary embodiment. The apparatus 200 may divide the entire region of the touch screen 210 into a first region 212 and a second region 213 by a predetermined boundary line 214 and independently control the divided regions. Although the boundary line 214 shown in FIG. 2B passes through the center of the touch screen 210 to thereby divide the touch screen 210 into the first region 212 and the second region 213 with the same area, this is only an example. The location and the shape of the boundary line 214 are not limited to those of the shown linear center line and the first region 212 and the second region 213 also have different areas or shapes.

For example, the apparatus 200 may display a first screen on the first region 212 while displaying a second screen on the second region 213. Here, the first screen and the second screen may be either the same screen or different screens. The first screen and the second screen may be either screens embodied by a single application or screens embodied by different applications. In the following description, a mode in which the entire region of the touch screen 210 is divided is referred to as a divisional screen mode.

A user may operate the apparatus 200 to execute a divisional screen mode through various input schemes. For example, a user may input a preset input scheme in the screen shown in FIG. 2A, to operate the apparatus 200 to execute the divisional screen mode as shown in FIG. 2B. Otherwise, a user may input a preset input scheme in a menu screen, and operate the apparatus 200 to execute the divisional screen mode as shown in FIG. 2B. It is obvious to one skilled in the art to apply a design change to the scheme of executing the divisional screen mode through various ways, and the scope of the present invention is not limited by a change in the scheme of executing the divisional screen mode.

Figure 2C:
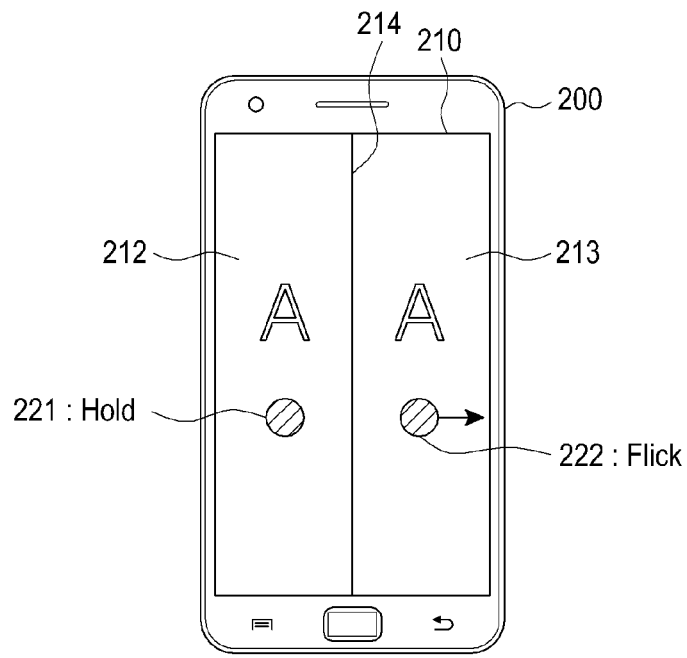

FIG. 2C is a conceptual diagram for describing a screen change scheme according to an exemplary embodiment. As shown in FIG. 2C, a screen change gesture 222 may be input on the second region 213. A screen hold gesture 221 may correspond to a command for maintaining the display of a corresponding screen. The screen hold gesture 221 may be a gesture of holding a touch on a point of the corresponding screen. Further, the screen change gesture 222 may correspond to a command for changing a display direction of the corresponding screen. The screen change gesture 222 may be, for example, a gesture of touching one point of a screen and then flicking the point in a display change direction as shown in FIG. 2C. The screen change gesture 222 may be carried out in different ways, which will be described in more detail with reference to FIGS. 3A to 3C.

The apparatus 200 or the controller 110 may determine whether the screen hold gesture 221 and the screen change gesture 222 have been simultaneously input. A simultaneous input of the screen hold gesture 221 and the screen change gesture 222 may be referred to as a display change event. When a display change event has been detected, the apparatus 200 maintains the display screen of the region in which the screen hold gesture 221 has been input. Further, the apparatus 200 displays the screen after changing the screen display direction of the region in which the screen change gesture 222 has been input. For example, a screen change event in FIG. 2C corresponds to a gesture of touching a point and then flicking the point rightward. This event may be a command indicating a counterclockwise rotation of the screen display direction by 90 degrees so as to enable another user to easily view the screen from the right side. In response to the screen change gesture 222, the apparatus 200 or the controller 110 may display the screen after rotating the screen display direction by 90 degrees in the counterclockwise direction. Meanwhile, the screen change gesture may be implemented by, for example, an upward-flick-after-touch or a leftward-flick-after-touch, which may be commands of rotating the screen display direction by 180 degrees and 270 degrees in the counterclockwise direction, respectively.

Figure 2D:
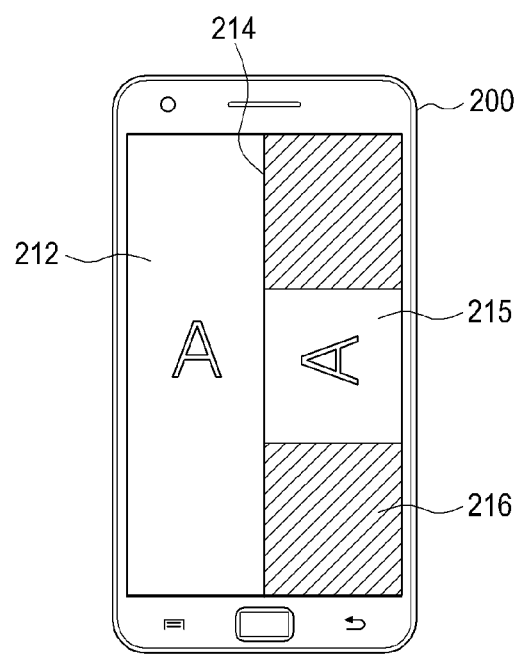
Figure 2E:
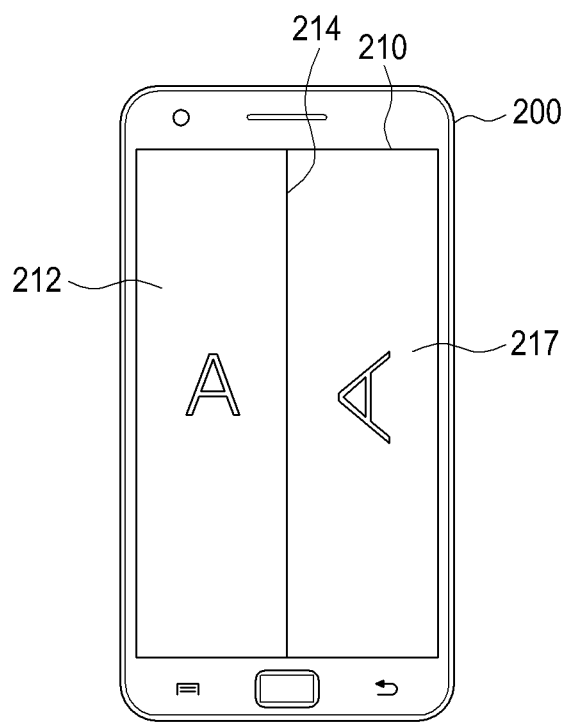

FIG. 2D is a conceptual diagram illustrating an apparatus according to an exemplary embodiment. As shown in FIG. 2D, the screen of the second region 213 may be displayed after being rotated by 90 degrees. The aspect ratio of the changed data generator 215 may be the same as the aspect ratio of the screen before the change as shown in FIG. 2C with no screen in the other regions. Meanwhile, as shown in FIG. 2E, an apparatus 200 according to another exemplary embodiment may display a changed second screen 217 with a changed aspect ratio on the second area.

Figure 3A:
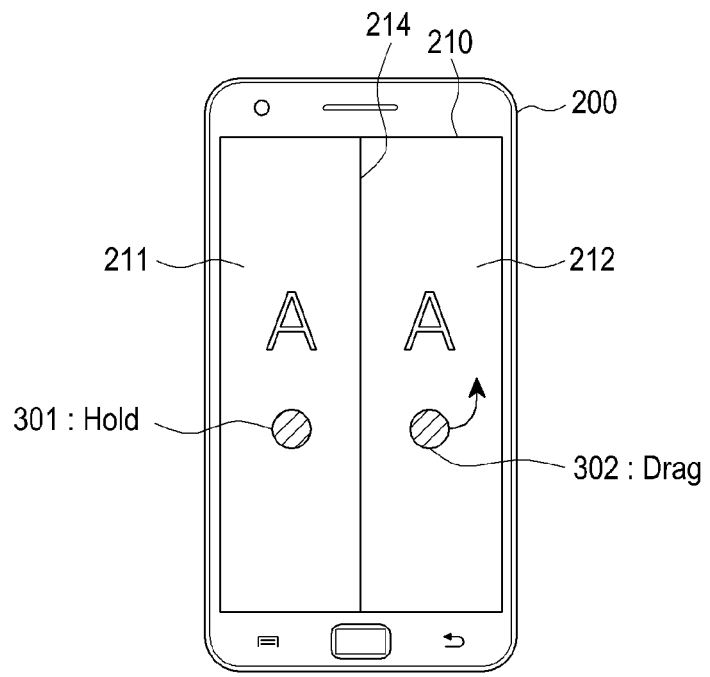
FIGS. 3A to 3C are conceptual diagrams for describing various screen change gestures.
Figure 3B:
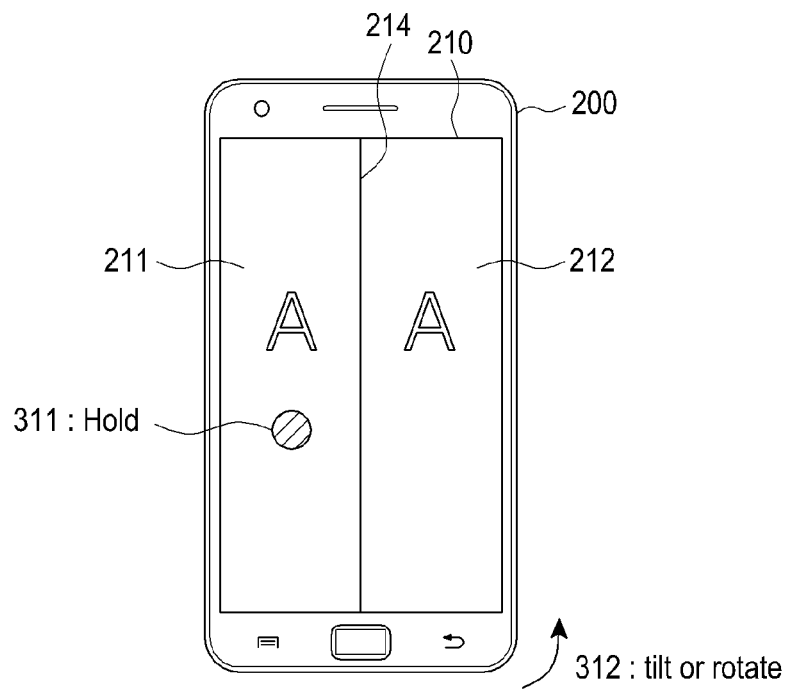
Figure 3C:
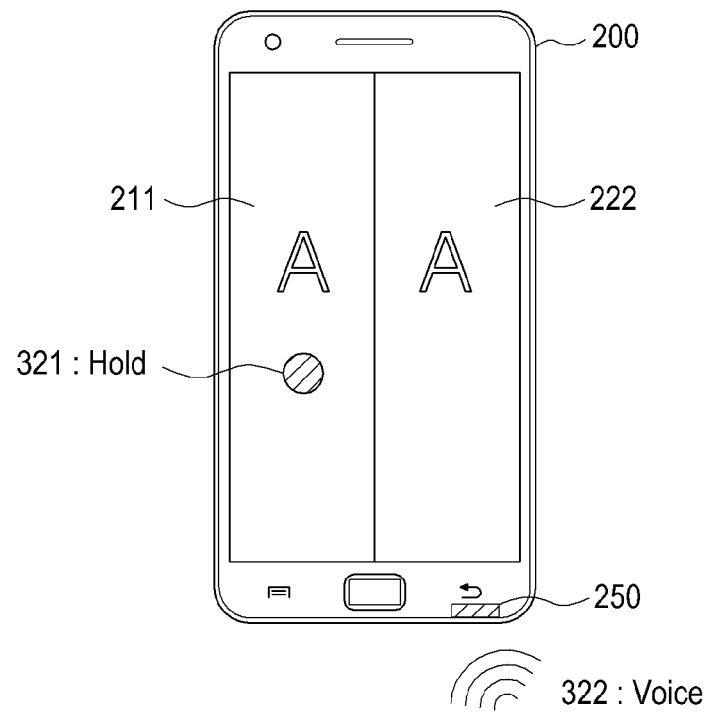

FIGS. 3A to 3C are conceptual diagrams for describing various screen change gestures. As shown in FIG. 3A, the display change event may be an event of inputting a screen hold gesture 301 to the first region 212 and inputting a drag motion 302 in the counterclockwise direction to the second region 213. The screen change gesture shown in FIG. 3A may be the drag motion 302 in the counterclockwise direction, and the apparatus 200 or the controller 110 may make a control to display the second screen after rotating the display direction of the second screen by 90 degrees in the counterclockwise direction.

Further, the drag motion may be a drag gesture from the upper end of the second region 213 to the right end thereof, a drag gesture from the right end to the lower end thereof, a drag gesture from the lower end to the left end thereof, a drag gesture from the left end to the upper end thereof, a drag gesture from the upper end to the left end thereof, a drag gesture from the left end to the lower end thereof, a drag gesture from the lower end to the right end thereof, or a drag gesture from the right end to the upper end thereof.

FIG. 3B shows a screen change gesture according to another embodiment of the present invention. As shown in FIG. 3B, the display change event may be an event of inputting a screen hold gesture 311 to the first region 212 and performing a tilting-or-rotating motion 312 of tilting or rotating the apparatus 200 in the counterclockwise direction. The screen change gesture shown in FIG. 3B may be a tilting-or-rotating motion 312 in the counterclockwise direction, and the apparatus 200 or the controller 110 may make a control to display the second screen after rotating the display direction of the second screen by 90 degrees in the counterclockwise direction.

FIG. 3C shows a screen change gesture according to another exemplary embodiment. As shown in FIG. 3C, the display change event may be an event of inputting a screen hold gesture 321 to the first region 212 and inputting a voice command with an indication to rotate the second screen. The screen change gesture shown in FIG. 3C may correspond to an input of a voice command with an indication to rotate the second screen, and the apparatus 200 or the controller 110 may make a control to display the second screen after rotating the display direction of the second screen by 90 degrees in the counterclockwise direction. In more detail, a microphone 250 may receive a voice command and output the command to the controller 110, and the controller 110 may analyze the input voice command to determine whether a screen change gesture has been input.

As described above, a screen change gesture according to the present exemplary embodiment may be a screen hold gesture for the first region or a screen change gesture for the second region.

Figure 4:
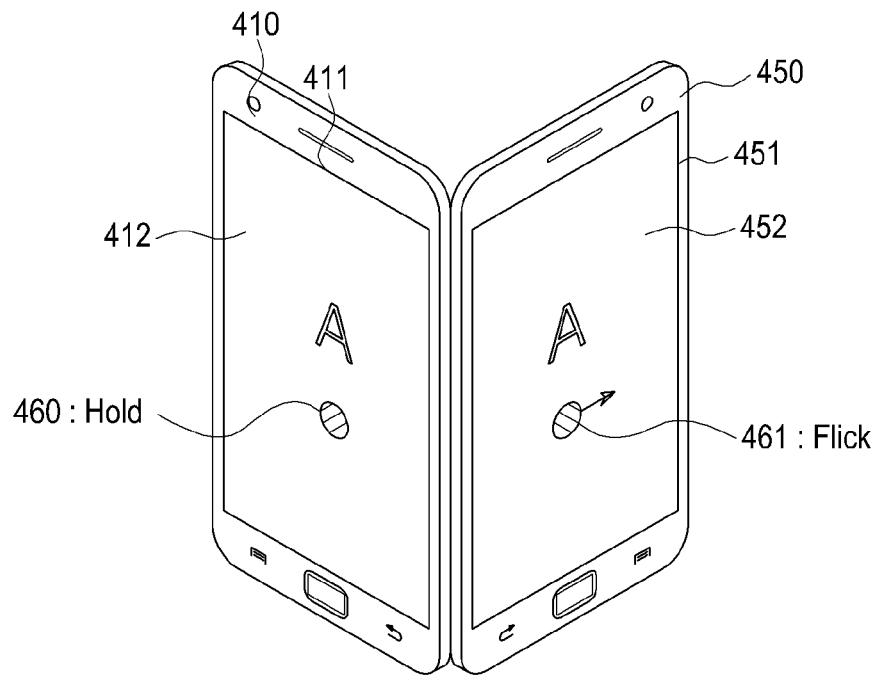
FIG. 4 is a conceptual diagram for describing a display change event for an apparatus according to another exemplary embodiment.

FIG. 4 is a conceptual diagram for describing a display change event for an apparatus according to another exemplary embodiment of the present invention. FIG. 4 may be a conceptual diagram of, for example, the apparatus shown in FIG. 1C or 1D. The apparatus may include a first housing 410 and a second housing 450. The first housing 410 includes a first touch screen 411 and the second housing 450 includes a second touch screen 451. The apparatus may control the first touch screen 411 to display a first picture 412 thereon and control the second touch screen 451 to display a second picture 452 thereon.

Meanwhile, a user may touch a point on the first touch screen 411 and then hold the touching, and may touch a point on the second touch screen 451 and then input a rightward flicking gesture. That is, a display change event in the exemplary embodiment shown in FIG. 4 may be an event of inputting a screen hold gesture 460 to the first touch screen 411 and inputting a screen change gesture 461 to the second touch screen 451.

The apparatus 200 or the controller 110 may detect the display change event and maintain the display of the first picture 412 on the first touch screen 411 in response to the screen hold gesture 460. Further, the apparatus 200 or the controller 110 may display the second picture 452 after changing the display direction of the second picture 452 on the second touch screen 451 in response to the screen change gesture 461. In response to various display change events described above with reference to FIGS. 3A to 3D as well as the display change event shown in FIG. 4, one skilled in the art may hold display of one touch screen among the first touch screen 411 and the second touch screen 451 while changing display of the other touch screen.

Figure 5A:
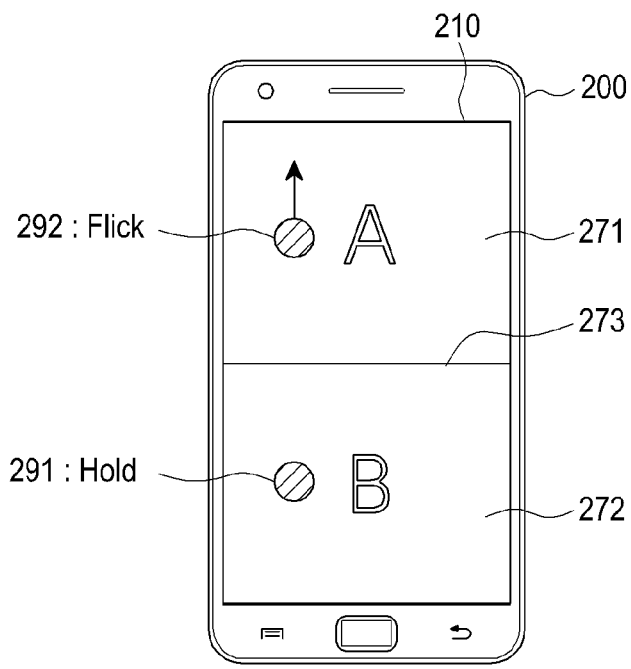
FIGS. 5A and 5B are conceptual diagrams of an apparatus according to an exemplary embodiment.
Figure 5B:
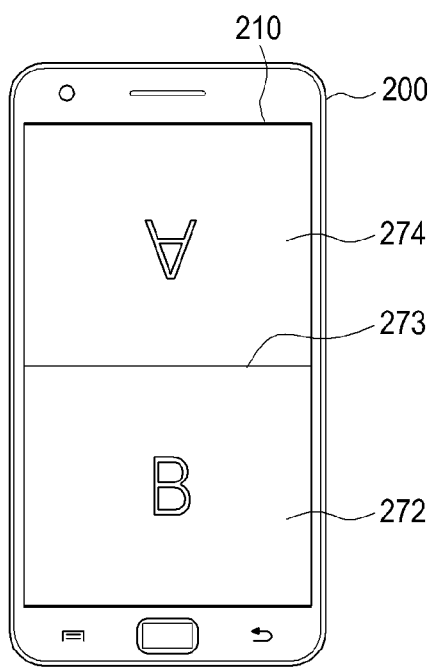

FIG. 5A is a conceptual diagram illustrating an apparatus according to an exemplary embodiment. The apparatus 200 shown in FIG. 5A has a horizontally extending boundary line 273, different from the apparatus shown in FIG. 2B. Different from the apparatus shown in FIG. 2B, a first region 271 and a second region 272 are formed above and under the boundary line 273, respectively. A display change event in FIG. 5A may include a gesture 292 of touching a point on the first region 271 and then flicking the point upward and a gesture 291 of holding a touch on a point of the second region 272. The apparatus 200 or the controller 110 may detect the display change event described above, hold the display of the second screen of the second region 272, and display the picture of the first screen after reversing the top and bottom of the picture shown in the first region 271. FIG. 5B shows a screen changed in response to the display change event. As noted from FIG. 5B, the display of the second region 272 is held without change, and the top and bottom of the first picture on the first region 271 are reversed.

Further, in FIG. 5A also, it is possible to input the flick in various ways, so as to change and display the first screen in various directions.

FIGS. 6A to 6D are conceptual diagrams for describing a display change of a view according to another exemplary embodiment.

Figure 6A:
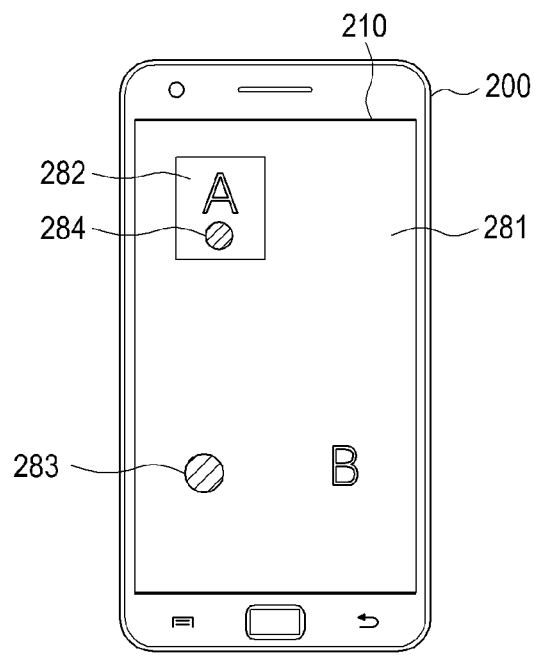
FIGS. 6A to 6D are conceptual diagrams for describing a display change of a view according to another exemplary embodiment.

As shown in FIG. 6A, a first region 281 and a second region 282 are divided by a boundary line on the touch screen 210 of the apparatus 200. A view may be displayed on each of the first region 281 and the second region 282. For example, a web browser picture may be displayed on the entire touch screen 210 while a text is displayed on the first region 281 and an image relating to the text is displayed on the second region 282. That is, the first region 281 and the second region 282 may be regions in which different views of one screen are displayed, respectively.

Figure 6B:
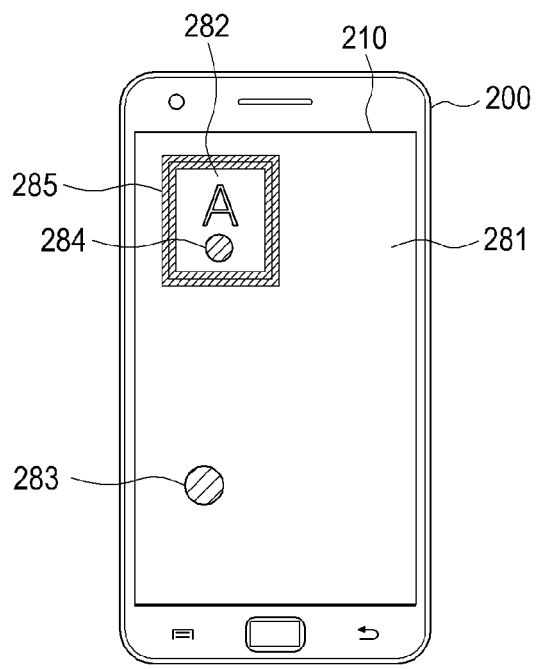

A user may touch a point in each of the first region 281 and the second region 282 as indicated by reference numerals 283 and 284, and an activated boundary line 285 may be accordingly displayed as shown in FIG. 6B. Based on the activated boundary line 285, the displays of the first region 281 and the second region 282 may be independently controlled. The user may reset the activated boundary line 285 so as to operate the apparatus 200 to enable an exact identification of a view, display of which is changed.

Figure 6C:
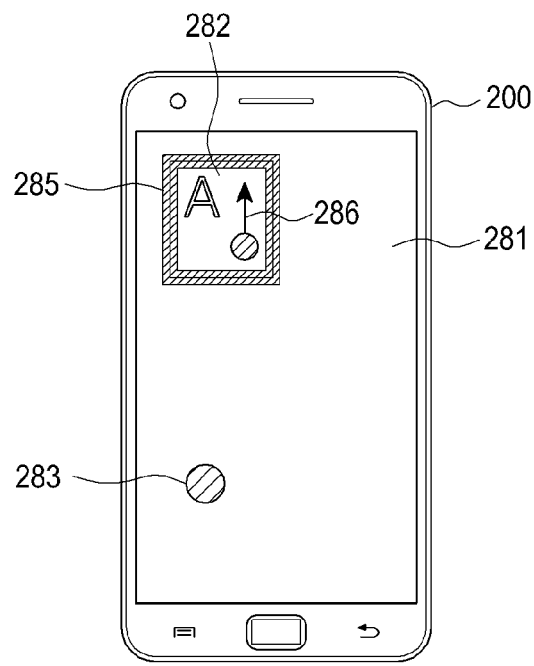
Figure 6D:
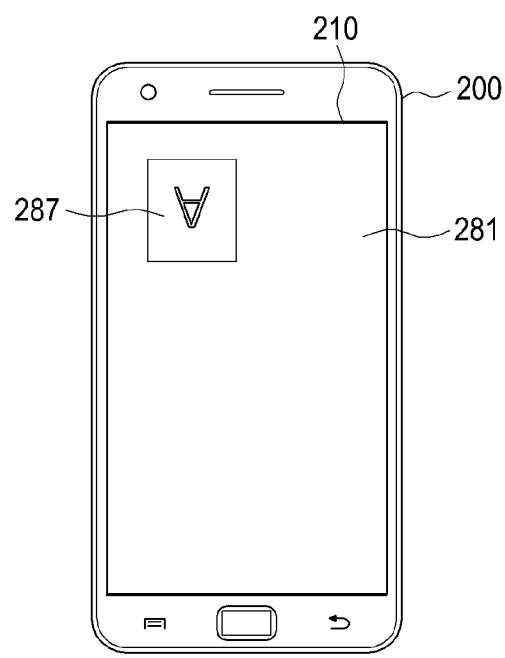

In FIG. 6C, a user may input a screen hold gesture 283 onto the first region 281 and a screen change gesture 286 onto the second region 282. Then, as shown in FIG. 6D, the display of the view on the first region 281 is held without change, and the top and bottom of the view on the second region 282 are reversed and displayed as indicated by reference numeral 287.

Of course, it is also possible to employ a configuration in which a display hold gesture is input to one region among the first region 281 and the second region 282 while a display change gesture is input to the other region among them, so as to change the display of a single region.

That is, the apparatus 200 according to the exemplary embodiments may maintain display of a part of different windows while changing the display direction of the other window. Further, the apparatus 200 according to the exemplary embodiments may maintain display of a part of different views while changing the display direction of the other view.

Figure 7:
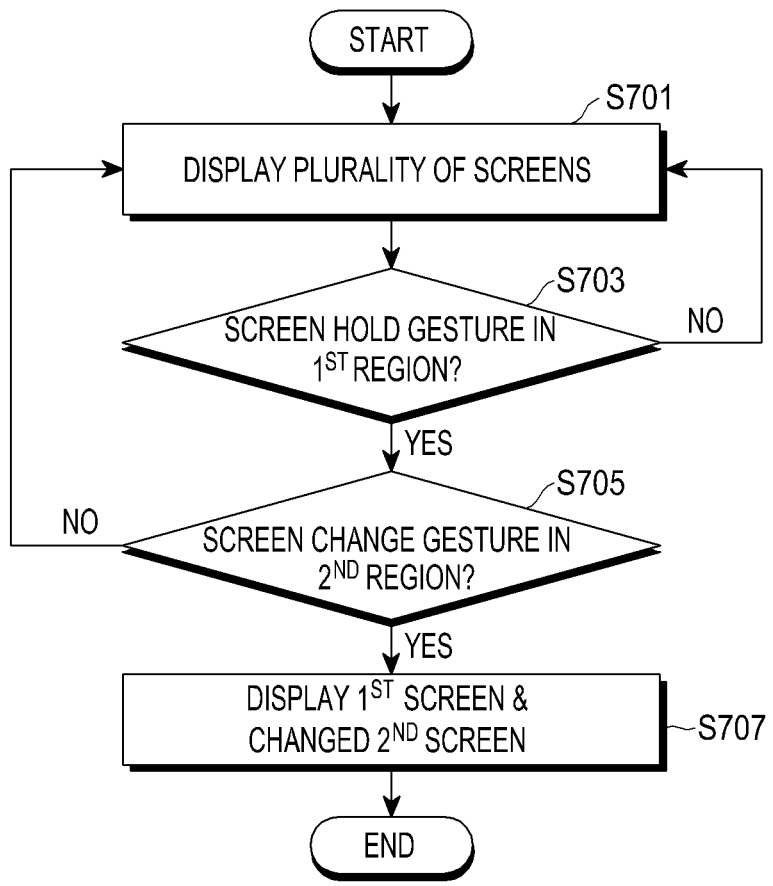
FIG. 7 is a flowchart of a screen display change method according to an exemplary embodiment.

FIG. 7 is a flowchart of a screen display change method according to an exemplary embodiment. As shown in FIG. 7, the touch screen 210 of the apparatus 200 may display a plurality of screens (operation S701). The plurality of screens may be windows or views.

The apparatus 200 or the controller 110 may determine whether a screen hold gesture has been input to a first region among a plurality of screens (operation S703). When a screen hold gesture has not been input to the first region (NO in operation S703), the plurality of screens go on being displayed on the touch screen 210. When it is determined that a screen hold gesture has been input to the first region (YES in operation S703), the apparatus 200 or the controller 110 determines whether a screen change gesture has been input to the second region (operation S705). When a screen change gesture has not been input to the second region (NO in operation S705), the plurality of screens go on being displayed on the touch screen 210 (operation S701). When a screen hold gesture has been input to the first region and a screen change gesture has been input to the second region (YES in operation S705), the second screen may be changed and displayed while maintaining the display of the first screen (operation S707).

It can be appreciated that the method of controlling the camera apparatus according to the exemplary embodiments can be implemented in software, hardware, or a combination thereof. Any such software may be stored, for example, in a volatile or non-volatile storage device such as a read-only memory (ROM), a memory such as a random access memory (RAM), a memory chip, a memory device, or a memory integrated circuit (IC), or a recordable optical or magnetic medium such as a compact disk (CD), a digital versatile disk (DVD), a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement exemplary embodiments. Therefore, exemplary embodiments provide a program including codes for implementing a system or method claimed in any claim of the accompanying claims and a machine-readable device for storing such a program. Further, this program may be electronically conveyed through any medium such as a communication signal transferred via a wired or wireless connection, and exemplary embodiments appropriately include equivalents thereto.

Further, the apparatus can receive the program from a program providing apparatus connected to the apparatus wirelessly or through a wire and store the received program. The program providing apparatus may include a memory for storing a program containing instructions for allowing the apparatus to perform a preset content protecting method and information required for the content protecting method, a communication unit for performing wired or wireless communication with the apparatus, and a controller for transmitting the corresponding program to the apparatus according to a request of the apparatus or automatically.

While exemplary embodiments have been shown and described, it will be understood by those skilled in the art that various changes in form and details may be made therein without departing from the spirit and scope of the present invention as defined by the appended claims.

What is claimed is:

1. An apparatus comprising:
   a touch screen to display a first content in a first region of the touch screen and a second content in a second region of the touch screen; and
   a controller to detect whether an event for changing a display orientation of the touch screen occurs in the second region, and change a display orientation of the second content while a display orientation of the first content is maintained, in response to the event for changing the display status of the touch screen.

2. The apparatus of claim 1, wherein the event for changing the display status of the touch screen corresponds to an event of inputting a screen hold gesture to the first region and inputting a screen change gesture to the second region.

3. The apparatus of claim 2, wherein the screen hold gesture corresponds to a gesture of touching a point of the first region and then holding a touch on the point.

4. The apparatus of claim 2, wherein the screen change gesture corresponds to a gesture of touching a point of the second region and then flicking the point one from among rightward, downward, leftward, and upward.

5. The apparatus of claim 4, wherein when the screen change gesture corresponds to a gesture of touching the point of the second region and then flicking the point one from among rightward, upward, and leftward, the controller rotates the second content by one from among 90 degrees, 180 degrees, and 270 degrees, respectively, in a counterclockwise direction.

6. The apparatus of claim 2, wherein the screen change gesture corresponds to one from among a drag gesture from a top of the second region to a right end of the second region, a drag gesture from the right end of the second region to a bottom of the second region, a drag gesture from the bottom of the second region to a left end of the second region, a drag gesture from the left end of the second region to the top of the second region, a drag gesture from the top of the second region to the left end of the second region, a drag gesture from the left end of the second region to the bottom of the second region, a drag gesture from the bottom of the second region to the right end of the second region, and a drag gesture from the right end of the second region to the top of the second region.

7. The apparatus of claim 2, wherein the screen change gesture corresponds to one from among a motion to rotate and a motion to tilt the apparatus one from among clockwise and counterclockwise.

8. The apparatus of claim 1, wherein the controller performs controlling to display the second content with a changed aspect ratio.

9. The apparatus of claim 1, wherein each of the first content and the second content comprises a window which corresponds to a screen for executing an application.

10. The apparatus of claim 1, wherein each of the first content and the second content comprises a screen corresponding to a view.

11. A method for screen change of an apparatus comprising a touch screen including a first region where a first content is displayed and a second region where a second content is displayed, the method comprising:
displaying the first content in the first region of the touch screen and the second content in the second region of the touch screen;
detecting whether an event for changing the display status of the touch screen occurs in the second region; and
changing a display orientation of the second content while a display orientation of the first content is maintained, in response to the event for changing the display status of the touch screen.

12. The method of claim 11, wherein the detecting whether the event for changing the display status of the touch screen occurs in the second region comprises:
determining whether a screen hold gesture has been input to the first region; and
determining whether a screen change gesture has been input to the second region.

13. The method of claim 12, wherein the screen hold gesture corresponds to a gesture of touching a point of the first region and then holding the touch on the point.

14. The method of claim 12, wherein the screen change gesture corresponds to a gesture of touching a point of the second region and then flicking the point one from among rightward, downward, leftward, and upward.

15. The method of claim 14, wherein changing the display orientation of the second content while maintaining the display of the first content comprises:
when the screen change gesture corresponds to a gesture of touching the point of the second region and then flicking the point one from among rightward, upward, and leftward, performing controlling to rotate the second content by one from among 90 degrees, 180 degrees, and 270 degrees, respectively, in a counterclockwise direction.

16. The method of claim 12, wherein the screen change gesture corresponds to one from among a drag gesture from a top of the second region to a right end of the second region, a drag gesture from the right end of the second region to a bottom of the second region, a drag gesture from the bottom of the second region to a left end of the second region, a drag gesture from the left end of the second region to the top of the second region, a drag gesture from the top of the second region to the left end of the second region, a drag gesture from the left end of the second region to the bottom of the second region, a drag gesture from the bottom of the second region to the right end of the second region, or a drag gesture from the right end of the second region to the top of the second region.

17. The method of claim 12, wherein the screen change gesture corresponds to one from among a motion to rotate and a motion to tilt the apparatus one from among clockwise and counterclockwise.

18. The method of claim 11, wherein the changing the display orientation of the second content while a display orientation of the first content is maintained comprises:
displaying the second content with a changed aspect ratio.

19. The method of claim 11, wherein each of the first content and the second content comprises a window which corresponds to a screen for executing an application.

20. The method of claim 11, wherein each of the first content and the second content comprises a screen corresponding to a view.

21. The apparatus of claim 2, wherein the screen hold gesture and the screen change gesture are input simultaneously.

22. The method of claim 12, further comprising detecting whether the screen hold gesture has been simultaneously input with the screen change gesture.

23. An apparatus comprising:
a first housing comprising a first touch screen to display a first region where a first content is displayed;
a second housing comprising a second touch screen to display a second region where a second content is displayed, the first housing and the second housing being connected by at least one from among a hinge and flexible member; and
a controller to detect whether an event for changing a display status of the touch screen for a screen display change occurs in the second region, and to change a display orientation of the second content while a display of the first content is maintained based on the event for changing the display status of the touch screen.

* * * * *